US010927976B2

United States Patent
Czaplewski et al.

(10) Patent No.: US 10,927,976 B2
(45) Date of Patent: Feb. 23, 2021

(54) HOSE WITH TUNABLE FLEXIBILITY USING CYCLIZABLE, PHOTOCHROMIC MOLECULES

(71) Applicant: International Business Machines Corporation, Armonk, NY (US)

(72) Inventors: Sarah K. Czaplewski, Rochester, MN (US); Brandon M. Kobilka, Fishkill, NY (US); Jason T. Wertz, Pleasant Valley, NY (US); Jing Zhang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/545,285

(22) Filed: Aug. 20, 2019

(65) Prior Publication Data

US 2019/0376618 A1    Dec. 12, 2019

Related U.S. Application Data

(62) Division of application No. 15/334,097, filed on Oct. 25, 2016, now Pat. No. 10,451,195.

(51) Int. Cl.
| | | |
|---|---|---|
| *F16K 99/00* | (2006.01) | |
| *C08F 216/12* | (2006.01) | |
| *C08G 77/385* | (2006.01) | |
| *C08L 83/10* | (2006.01) | |
| *C08L 83/16* | (2006.01) | |
| *C08G 77/28* | (2006.01) | |
| *C08L 45/00* | (2006.01) | |

(52) U.S. Cl.
CPC ...... *F16K 99/0042* (2013.01); *C08F 216/125* (2013.01); *C08G 77/28* (2013.01); *C08G 77/385* (2013.01); *C08L 83/10* (2013.01); *C08L 83/16* (2013.01); *F16K 99/004* (2013.01); *C08G 2280/00* (2013.01); *C08L 45/00* (2013.01); *C08L 2201/12* (2013.01)

(58) Field of Classification Search
None
See application file for complete search history.

(56) References Cited

U.S. PATENT DOCUMENTS

| | | | |
|---|---|---|---|
| 5,163,952 A | * | 11/1992 | Froix ................ A61F 2/82 623/1.18 |
| 5,310,909 A | | 5/1994 | Fischer et al. |
| 5,954,744 A | * | 9/1999 | Phan ............... A61L 31/048 606/198 |
| 6,479,604 B1 | | 11/2002 | Kim et al. |
| (Continued) | | | |

FOREIGN PATENT DOCUMENTS

| | | |
|---|---|---|
| CA | 2635037 Y | 8/2004 |
| CN | 1801359 A | 7/2006 |
| (Continued) | | |

OTHER PUBLICATIONS

Lendlein et al., "Light-induced shape-memory polymers", Nature, vol. 434, Apr. 14, 2005, 879-882 (Year: 2005).*

(Continued)

*Primary Examiner* — Nicole M. Buie-Hatcher
(74) *Attorney, Agent, or Firm* — Patterson + Sheridan, LLP

(57) ABSTRACT

Embodiments of the disclosure generally provide methods related to articles that display reversible photoresponsive behavior.

20 Claims, 1 Drawing Sheet

(56) References Cited

U.S. PATENT DOCUMENTS

| | | | |
|---|---|---|---|
| 7,041,763 B2 | 5/2006 | Branda et al. | |
| 7,452,950 B2 | 11/2008 | Dunaev et al. | |
| 7,607,634 B2 | 10/2009 | Browne et al. | |
| 8,172,873 B2* | 5/2012 | Anthamatten | C08F 265/06 606/231 |
| 8,536,205 B2 | 9/2013 | Branda et al. | |
| 2003/0130456 A1* | 7/2003 | Kim | C08G 61/122 526/242 |
| 2004/0030078 A1 | 2/2004 | Branda et al. | |
| 2005/0075265 A1* | 4/2005 | De Salvert | A61Q 1/14 510/407 |
| 2005/0233149 A1 | 10/2005 | Ansell | |
| 2006/0091364 A1 | 5/2006 | Alfimov et al. | |
| 2006/0257629 A1 | 11/2006 | Lendlein et al. | |
| 2007/0097469 A1 | 5/2007 | Erben et al. | |
| 2007/0299456 A1* | 12/2007 | Teague | A61B 17/221 606/127 |
| 2008/0311491 A1 | 12/2008 | Iftime et al. | |
| 2011/0092652 A1* | 4/2011 | Voit | C08G 18/4833 525/328.4 |
| 2011/0144227 A1* | 6/2011 | Bowman | C08G 18/3206 522/96 |
| 2012/0182609 A1 | 7/2012 | Borenstein et al. | |
| 2013/0287961 A1 | 10/2013 | Thomas, III et al. | |
| 2014/0209842 A1 | 7/2014 | Pagba et al. | |
| 2015/0346147 A1 | 12/2015 | Orwar et al. | |
| 2016/0158754 A1 | 6/2016 | Ziolkowski et al. | |
| 2016/0177929 A1 | 6/2016 | Marion, III et al. | |
| 2017/0226290 A1 | 8/2017 | Boday et al. | |
| 2017/0267689 A1 | 9/2017 | Montemagno et al. | |
| 2018/0112018 A1 | 4/2018 | Czaplewski et al. | |

FOREIGN PATENT DOCUMENTS

| | | | |
|---|---|---|---|
| CN | 104926977 A * | 9/2015 | |
| GB | 830226 A * | 3/1960 | C08L 27/02 |
| KR | 20090054344 A | 5/2009 | |
| WO | 2007001407 A2 | 1/2007 | |

OTHER PUBLICATIONS

Machine translation of CN 104926977 A, retrieved Aug. 2020 (Year: 2020).*

Pariani et al. "Photochromic polyurethanes for rewritable CGHs in optical testing", Optics Express (2011), 19(5), 4536-4541. (Year: 2011).

Irie et al. "Photochromism of Diarylethene Molecules and Crystals: Memories, Switches, and Actuators", Chem. Rev. 2014, 114, 12174-12277. (Year: 2014).

Biteau et al., "Large and Stable Refractive Index Change in Photochromic Hybrid Materials", Chem. Mater. 1998, 10, 1945-1950. (Year: 1998).

Kawai et al., "A Novel Photoresponsive TT-Conjugated Polymer Based on Diarylethene and its Photoswitching Effect in Electrical Conductivity", Advanced Materials, (2005), 17(3), 309-314. (Year: 2005).

Uchida et al., "Synthesis of Novel Photochromic Films by Oxidation Polymerization of Diarylethenes Containing Phenol Groups", Advanced Functional Materials (2003), 13(10). 755-762. (Year: 2003).

Nishi et al., "Photochromism and Optical Property of Gold Nanoparticles Covered with Low Polydispersity Diarylethene Polymers", Macromolecules (2008), 41, 3995-4002. (Year: 2008).

Areephong et al. "On/Off Photoswitching of the Electropolymerizability ofTerthiophenes", J. Am. Chem. Soc. 2008, 103, 12850-12851. (Year: 2008).

Fiore et al., "Optically healable polymers", Chem. Soc. Rev. 2013, 42, 7278-7288. (Year: 2013).

Yunus et al. "Fabrication of microfluidic device channel using a photopolymer for colloidal particle separation", Microsyst. Technol. (2010), 16, 2099-2107. (Year: 2010).

IBM, "List of IBM Patents or Patent Applications Treated As Related," for U.S. Appl. No. 16/545,285 "Hose With Tunable Flexibility Using Cyclizable Photocromic Molecules," filed Aug. 20, 2019.

U.S. Appl. No. 16/423,264 "Hose With Tunable Flexibility Using Cyclizable, Phtochromic Molecules," as filed May 28, 2019.

* cited by examiner

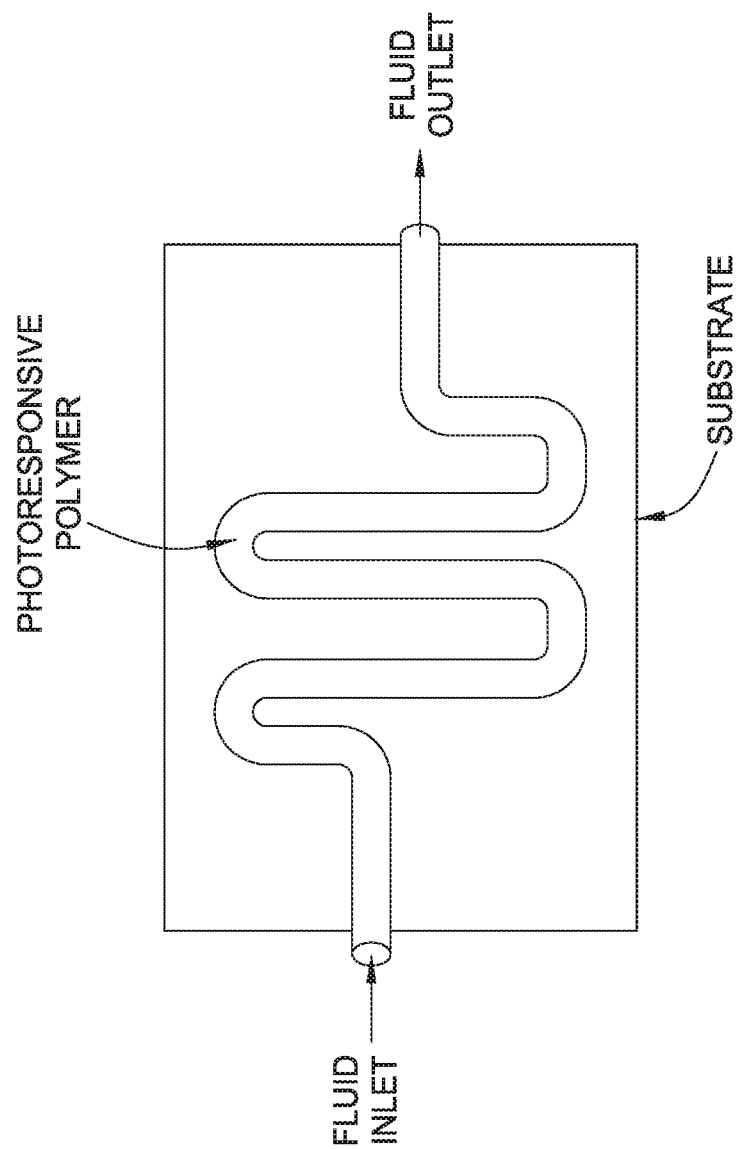

HOSE WITH TUNABLE FLEXIBILITY USING CYCLIZABLE, PHOTOCHROMIC MOLECULES

CROSS-REFERENCE TO RELATED APPLICATIONS

This application is a divisional of co-pending U.S. patent application Ser. No. 15/334,097, filed Oct. 25, 2016. The aforementioned related patent application is herein incorporated by reference in its entirety.

FIELD

The present disclosure relates to new compositions and methods related to photoresponsive articles and objects that may reversibly switch from high to low modulus or rigid to flexible states. The compositions and methods described herein are useful for fluid and material transport and in electronic applications.

BACKGROUND

Photochromic molecules, oligomers, and polymers have been investigated for use in a variety of applications including molecular switches, color changing lenses (e.g. sunglasses), optical data storage, solar energy storage, and as selective masking materials for nanolithography. It would be useful to have a photochromic polymer with variable modulus that may be used in new applications. Switching between a rigid or a flexible state (tunable modulus), may be achieved by changes in the bonding of atoms or molecules to one another at the surface and/or within the material, by irradiation with ultraviolet (UV) or visible light. Herein, we present new compositions and methods to create cylindrical articles such as hoses, tubes, solid rods, cylinders, and other articles with tunable moduli.

SUMMARY

In an embodiment is provided an article containing a polymer with photoreactive groups, the polymer having a modulus that changes when the polymer is irradiated with ultraviolet or visible light, and photoreactive groups that absorb ultraviolet radiation of wavelengths from 100 nm to 400 nm. The article has a polymer with at least one photoreaction product of ultraviolet radiation absorption, and the photoreaction product includes a cyclic carbon group that is a product of a cycloaddition reaction. The cycloaddition reaction is a $[2\pi+2\pi]$ cycloaddition reaction in which the cyclic carbon group can form ring-open reaction product(s). The article modulus increases upon radiation absorption, because the article contains a polymer with photoreactive groups that absorb visible radiation of wavelengths from 400 nm to 700 nm. The photoreactive groups of this disclosure contain ring-open reaction products. Further, the article of this disclosure exhibits a modulus decrease upon light absorption, and the reaction products are photo-cleavage reaction products. The article of this disclosure may be a tube, a pump, or may be a microfluidic device. The article may be cylindrical, and may be a conducting polymer or an electrical semiconductor.

In another embodiment is provided a method for producing a photoreactive polymer with variable modulus that includes forming a reaction mixture comprising photoreactive monomer and non-photoreactive monomer, at least one catalyst; heating the mixture at a temperature from about 25° C. to about 300° C. to form a cured photoreactive polymer; and isolating and then extruding the photoreactive polymer into cylindrical form.

In another embodiment is provided a method for producing a photoreactive polymer with variable modulus that includes forming a reaction mixture comprising dithienylethene monomer and non-photoreactive monomer, at least one catalyst, the non-photoreactive monomer selected from the group consisting of ethylene, propylene, diene, vinylchloride, urethane, vinylchloride, a silicon containing group, and a combination thereof; heating the mixture at a temperature from about 25° C. to about 300° C. to form a cured photoreactive polymer; and isolating and then extruding the photoreactive polymer into cylindrical form.

In another embodiment is provided a method for producing a photoreactive polymer with variable modulus that includes forming a reaction mixture comprising dithienylethene monomer and non-photoreactive monomer, at least one catalyst, the non-photoreactive monomer selected from the group consisting of ethylene, propylene, diene, vinylchloride, urethane, vinylchloride, a silicon containing group, and a combination thereof; heating the mixture at a temperature from about 25° C. to about 300° C. to form a cured photoreactive polymer; isolating and then extruding the photoreactive polymer into cylindrical form; and covalently bonding the photoreactive polymer to a conducting polymer.

BRIEF DESCRIPTION OF THE SEVERAL VIEWS OF THE DRAWINGS

So that the manner in which the above recited features of the present disclosure can be understood in detail, a more particular description of this disclosure, briefly summarized above, may be had by reference to embodiments, some of which are illustrated in the appended drawings and in the body of the specification. It is to be noted, however, that the appended and embedded drawings illustrate only typical embodiments of this disclosure and are therefore not to be considered limiting of its scope, for the disclosure may admit to other equally effective embodiments.

The FIGURE is an example of a microfluidic device.

To facilitate understanding, identical reference numerals have been used, where possible, to designate identical elements that are common to the figures and drawings. It is contemplated that elements disclosed in one embodiment may be beneficially utilized on other embodiments without specific recitation.

DETAILED DESCRIPTION

Stimuli-responsive polymeric systems including photoresponsive polymers (PRPs) may be used to fabricate smart and functional materials for use in a variety of technological and consumer applications, and may display a photochromic response such as a color change or may switch from transparent to opaque. Photoresponsive polymers may undergo property changes upon the application of UV and/or visible light. The property changes may be due to non-destructive bonding and/or debonding of chemical structures within a polymer network such as photodimerisation, cycloaddition, and other ring opening or closing photoreactions. The non-destructive bonding and/or debonding of chemical structures may result in structural alterations of the polymer network. Useful light activated chemical reactions of PRPs may be advantageously performed with a PRP in the solid, glassy, rubbery, or liquid state, and at ambient temperatures.

Disclosed herein are new PRPs with photoresponsive and photoreversible chemical groups that allow the polymer to be structurally altered when irradiated with UV or visible light. The structural alteration may manifest as a measurable bulk property such as storage modulus E'. Storage modulus E', a measurement of a material's elastic response, is a useful metric for performance of an elastic material in applications where an object may be stressed or impacted in some way. A material with a high storage modulus E' is typically rigid, and may be hard as well (e.g. Shore hardness). In contrast, a material with a low storage modulus E' is typically soft, flexible, and generally rubber-like. The storage modulus E' of most elastic materials ranges from 1 MPa to 3,000 MPa, with low modulus materials having E' of 1 MPa to 100 MPa, medium modulus materials having E' of 100 MPa to 500 MPa, and high modulus materials having E' of 500 MPa to 3,000 MPa. Storage modulus E' is typically calculated by dividing an applied tensile stress by the extensional strain in the elastic linear portion of the stress-strain curve (e.g., slope, or $\Delta y/\Delta x$). Similarly, the ratio of viscous stress to viscous strain is used to define the loss modulus E", a measure of a materials viscous properties. Storage modulus may be measured at a desired temperature using a material testing technique, such as dynamic mechanical analysis (DMA) (e.g., ASTM D4065, D4440, and D5279). When comparing properties of different materials, it is typical to measure the storage modulus E' of the material at a single temperature, in a range between 25° C. and 40° C., such as 40° C.

In relation to the PRPs of this disclosure, it is noted that both storage modulus E' and loss modulus E" (which are the tensile measurements of modulus, as distinguished from the corresponding shear measurements G' and G") are intrinsic material properties that result from the chemical bonding within a material. For example, a high storage modulus E' material composition or molecular structure may be at least one, or a mixture of, chemical groups and/or structural features including aromatic ring(s) and some aliphatic chains. In some cases, the high storage modulus E' materials may have a crosslinking density greater than 2%. The high storage modulus E' compositions have a high hardness value, and display the least elongation. Medium storage modulus E' compositions may contain a mixture of aromatic rings, crosslinking, but may contain a greater content of aliphatic chains, ether segments, and/or polyurethane segments, than high storage modulus E' compositions. The medium storage modulus E' compositions may have intermediate rigidity, hardness, and display a larger amount of elongation than the high storage modulus E' materials. Low storage modulus E' compositions may contain aliphatic chains, ether segments, and/or polyurethane segments, with minimal or no contribution from aromatic rings or crosslinking. As mentioned prior, low storage modulus E' compositions may be flexible, soft, and/or rubber-like. In further discussions of this disclosure, we will generally refer to storage modulus E' as "modulus" for the sake of clarity.

In some embodiments of this disclosure, PRPs may be structurally altered by photochemical modification in localized areas of the material using patterned mask(s), such as those used to create patterns in conventional photoresist materials. Alternatively, the entire object or article may be structurally altered by photochemical modification to achieve the desired response. The irradiation of these areas may cause a switch to a more rigid (higher modulus) material from a more rubber-like or flexible (lower modulus) material, or vice versa.

In some embodiments of this disclosure, switching may create a pumping action, such as peristaltic, with a hollow PRP article or object, such as a hose or a tube. In this disclosure, we do not restrict the type of pumping action performed by such a tube or a hose when irradiated. The hose or tube may be part of a microfluidic device. A microfluidic device or chip may be a set of micro-channels etched or molded into a material (e.g, glass, silicon, or polymer such as polydimethylsiloxane). The micro-channels that form a microfluidic chip are connected together in order to achieve the desired features, such as mix, pump, and sort. The micro-channels in the microfluidic chip are connected to the outside by inputs and outputs by which liquids or gases are injected and removed from the microfluidic chip. In one embodiment, a microfluidic device may contain a tube made of photoresponsive polymer and include a one-way valve. By cyclic irradiation of a spot(s) on the tube, one may produce mechanical displacements in the radial direction that produces a pumping action. In other embodiments, the switching may actuate a lever, or cause some useful movement. The FIGURE is an example of a microfluidic device that contains a hollow PRP that may contain a fluid. As shown, the PRP may be supported by a substrate such as glass or a polymer material, and the PRP may be irradiated along any portion of its length to change its modulus and thus create a pumping action or response. In further embodiments, a cylindrical article or object made from a PRP may be a PRP that is an electrically or thermally conductive polymer, and may be in a cylindrical shape such as a wire shape. A conductive PRP may have extended $\pi$-conjugation along the main polymer chain or backbone, and may be doped or undoped. In these embodiments, the electrical or thermal conductive properties of a PRP article or object may be altered by selective or bulk light irradiation.

Useful photoresponsive groups bonded to PRPs and their copolymers may be selected from those chemical groups/groups that undergo bonding and debonding in the presence of UV and/or visible light at certain wavelengths. These groups typically include sites of unsaturation (multiply bonded carbon atoms or heteroatoms) and/or aromaticity that may react by either a $[4\pi+4\pi]$ or $[2\pi+2\pi]$ cycloaddition mechanism. Such a reaction may be reversed to reproduce the groups or bonds upon application of an appropriate wavelength of light. Photoresponsive groups bonded to PRPs should also fulfill the following requirements (a) thermal stability of both open and closed ring isomers, (b) isomerization repeatability, (c) high sensitivity, (d) rapid response, and (e), reactivity in a solid state.

A class of photochromic molecules which fulfills the above requirements simultaneously is the "diarylethene" family, which is a derivative of a stilbene molecule or a stilbene group. For example, when the phenyl rings of stilbene are replaced with five-membered heterocyclic rings with low aromatic stabilization energy, such as thiophene or furan rings, both open and closed ring isomers become thermally stable and switching between open and closed may be repeated many times. The thiophene derivative of the diarylethene is commonly referred to as a "dithienylethene" (DTE). In embodiments of this disclosure, the DTE groups may be part of a PRP network, such as a PRP chain or backbone, and/or the DTE groups may be pendant groups.

Reaction example 1 illustrates a DTE photoresponsive group or molecule that contains carbon-carbon double bonds that undergo a [2π+2π] cycloaddition reaction when irradiated with light:

Reaction Example 1

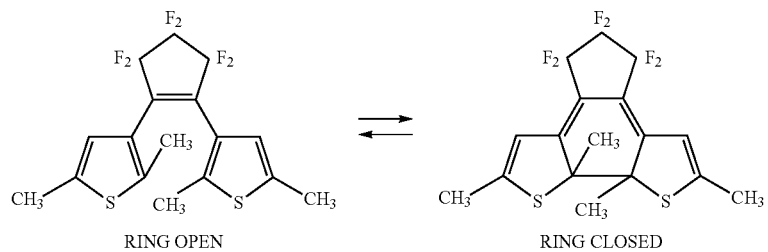

Reaction example 1 shows both the ring open (colorless to the naked eye) and ring closed (red color to the naked eye) states of the DTE molecule, 1,2-bis(2,5-dimethyl-3-thienyl) perfluorocyclopentene. The ring open and ring-closed states of this DTE molecule are produced by irradiation of the molecule or group with UV (10 nm to 400 nm) or visible light (400 nm to 700 nm). In some embodiments of this disclosure, a ring closed photoreactive group may be produced by UV irradiation of a ring opened molecule or group. A ring closed group or groups may be referred to as cyclic carbon group(s). In other embodiments of this disclosure, visible light may be used to produce a ring opened product (photo-cleavage product).

In other embodiments of this disclosure, a DTE molecule may have varying molecular chain lengths, rings, and other structural motifs that yield different photochemical responses to irradiation, and thus different colors for the open or closed states. In further embodiments of this disclosure, a rigid PRP (containing DTE groups that are ring closed) may display a color that indicates a higher modulus state. Likewise, a rubber-like PRP (containing DTE groups that are ring opened) may display a color that indicates a lower state. In addition to color changes, this switching or bond isomerization may cause material volume changes, such as expansion and contraction, and/or changes in modulus. As mentioned prior, this may produce a pumping action if a hollow tube made from such material is switched at a certain frequency, from low to high modulus and back again, by cyclic exposure to UV and/or visible radiation. We note that irradiating this material with UV and/or visible light could result in non-linear behaviors due to absorbance and/or transmission effects. For example, if the material is thick enough, penetration of photons into the material will decline with depth resulting in less UV response. Similarly, a thin enough material will realize sufficient depth penetration for complete bond isomerization if so desired.

As mentioned above, the PRPs can be illuminated with UV light to undergo a ring closure or cyclization reaction to form a rigid polymeric material with tunable modulus depending on the ratio of hard to soft, or high or low modulus monomers. To reverse this, one may irradiate the higher modulus or more rigid material with visible light to cause the photo-cleavage reaction, and thus produce ring-opened DTE groups in the PRP. As discussed, the ring-opened form may lack color, while the ring-closed form may be deeply colored, from red to blue, which is based on the extended π-conjugation of the DTE groups or molecules. This allows for an easy visual indication of the state of the article, such as a hose. In further embodiments, an electrically conducting or semiconducting PRP (e.g. a conductive polymer) may be produced by synthesis of a PRP with a π-conjugated polymer chain or backbone. Upon irradiation of such a wire with UV and/or visible light, one may create a wire in open and closed circuit electrical states, or a semiconductor material. For example, an electrically conducting PRP may be produced by covalently bonding DTE groups to other π-conjugated groups to form a conducting polymer chain. The polymer may be doped or undoped. Examples of electrically conducting polymers include, but are not restricted to: polyphenylenes, polypyrenes, polyazulenes, polynaphthalenes, polypyrroles, polycarbazoles, polyindoles, polyazepines, polyanilines, and polythiophenes.

In embodiments of this disclosure, a PRP may be produced by incorporation of DTE groups or molecules that are functionalized with at least one reactive group, and thus, may be incorporated into a PRP by covalent bonding. A photoresponsive material that can be incorporated into a PRP may be referred to as a photoresponsive monomer. Examples of two DTE molecules containing aldehyde groups that may be converted by chemical synthesis to multifunctional photoresponsive monomers are shown below as A and B.

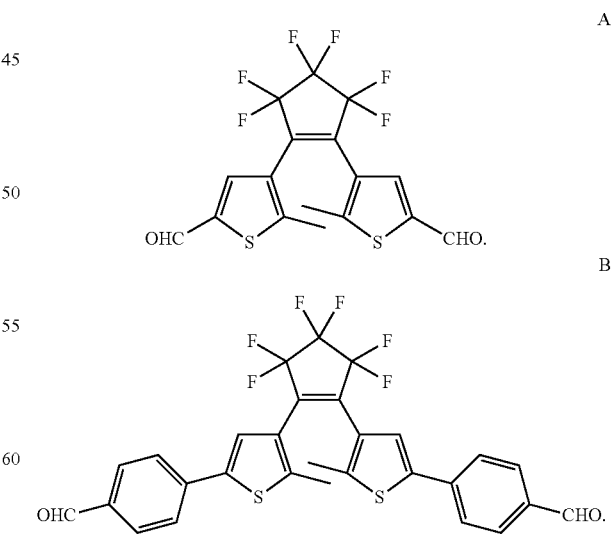

Molecules A and B contain aldehyde groups that can be polymerized with a suitable monomer, or may be converted to other groups that are polymerizable. In this disclosure, we do not restrict the type or identity of the polymerizable group attached to a photoresponsive group or molecule that yields a PRP after polymerization.

Preparation of a PRP containing a monomer derived from a molecule such as molecule A and/or molecule B, or any combination or mixture containing a photoresponsive group or monomer, may be accomplished by combining the appropriate monomers and initiators and/or catalysts in a reaction vessel and performing a polymerization reaction at a desired stoichiometric ratio. For the purposes of this disclosure, an initiator may be a source of any chemical species that reacts with a monomer to form an intermediate compound capable of linking successively with a large number of other monomers into a polymeric compound; and a catalyst may be a substance that speeds up a chemical reaction, but is not consumed by the reaction; hence a catalyst can be recovered chemically unchanged at the end of the reaction it has been used to speed up, or catalyze.

In embodiments of this disclosure, the polymerization reaction may also contain non-photoresponsive monomers, so that the photoresponsive monomers are copolymerized with other non-photoresponsive monomers, such as those monomers that may be precursors to a flexible low modulus and/or rubber-like polymer including, but not restricted to the group of polymers such as the polyurethanes, silicones, and polybutadienes. As mentioned previously, exposure to UV light may cause a ring closure to occur in such a material and, therefore, increase the modulus of the material. In this disclosure, we do not restrict the number of different monomers used, nor the type used to produce a PRP that features a photoreversible change in modulus. In some embodiments, a PRP may be foamed to form a foamed material with switchable modulus.

Reaction example 2 illustrates a reaction sequence in which an aldehyde-containing photoresponsive monomer (B) undergoes conversion to two different PRPs, PRP P1, and a PRP P2.

Reaction Example 2

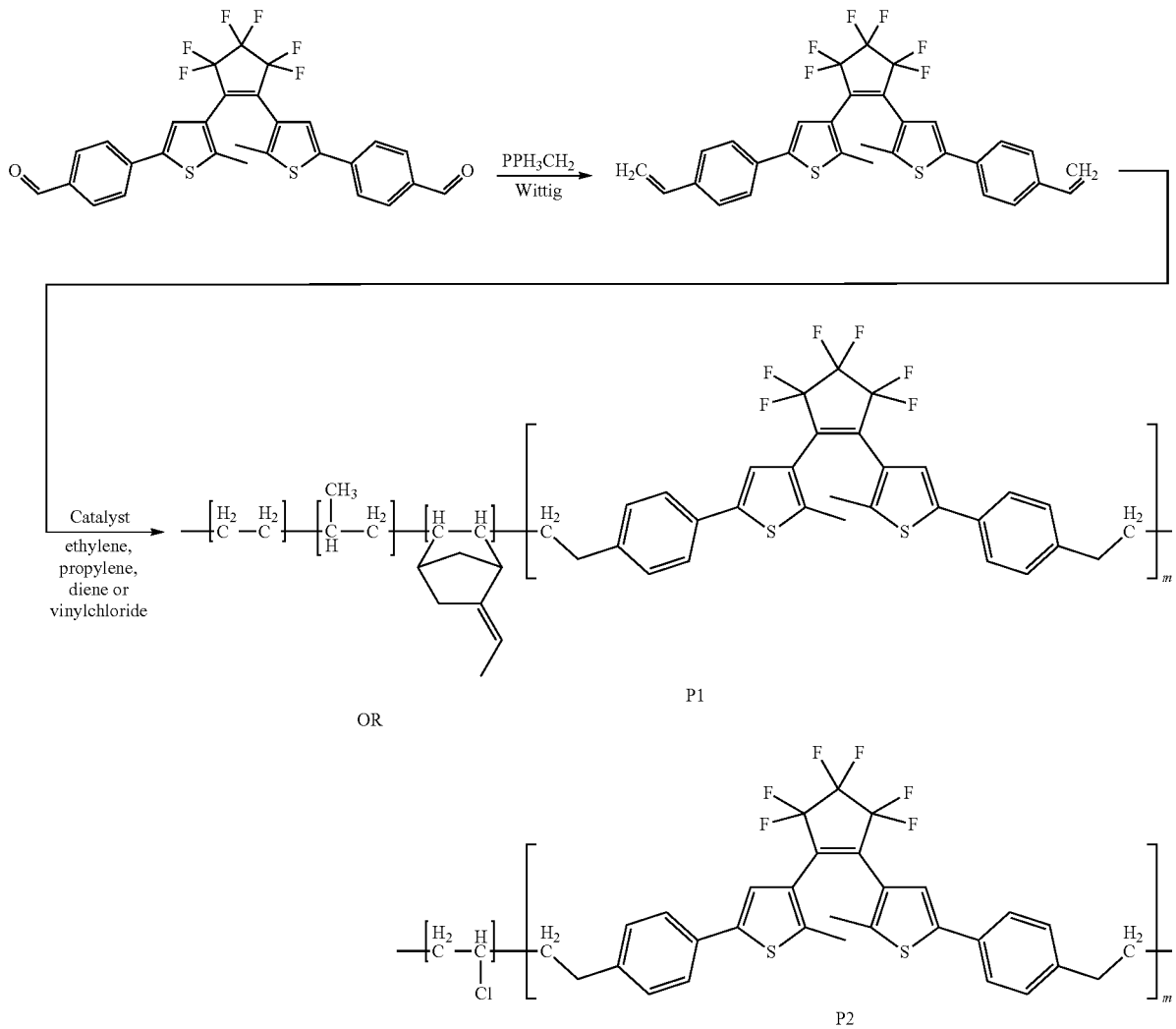

As shown in reaction example 2, the DTE aldehyde groups may be converted into vinyl groups by a Wittig reaction, and then may be copolymerized with any mixture of unsaturated monomers including, but not restricted to vinyl monomers, ethylene, propylene, and a diene, such as ethylidine norbornene, in the presence of a catalyst, such as a Ziegler-Natta catalyst (titanium (III) or (IV) and an alkyl aluminum), to give an PRP P1. Alternatively, the vinyl-DTE may be polymerized with vinyl chloride to produce PRP P2. The unsaturated monomers used in this disclosure are not restricted to any particular molecular structure or bonding motif, and may be cyclic, linear, monomeric, oligomeric, or polymeric.

Reaction example 3 shows an alternate reaction sequence to produce new PRPs by using a DTE with hydroxyl groups.

Reaction Example 3

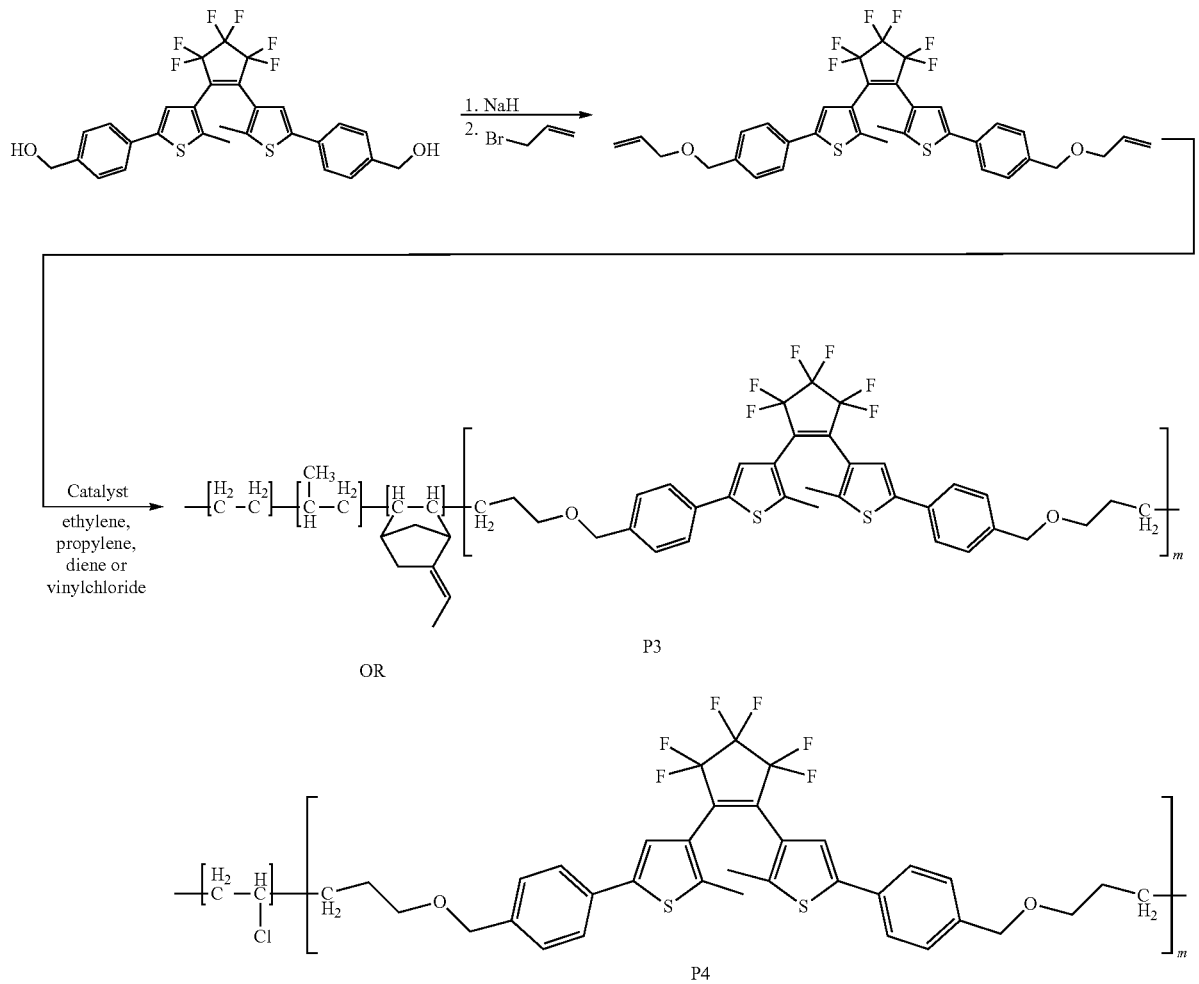

As shown in reaction example 3, the hydroxy DTE may be converted to a DTE with vinyl ether groups under Williamson ether synthesis conditions, and then may be polymerized with unsaturated monomers, per reaction example 2, to yield PRP P3 and PRP P4.

Reaction example 4 illustrates a reaction sequence to produce a silicone or polysiloxane PRP by using a DTE with hydroxyl groups.

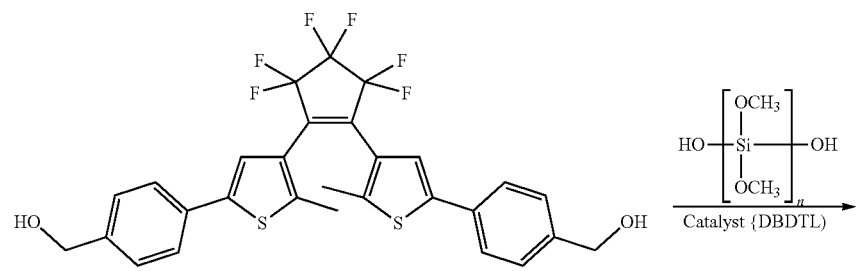

-continued

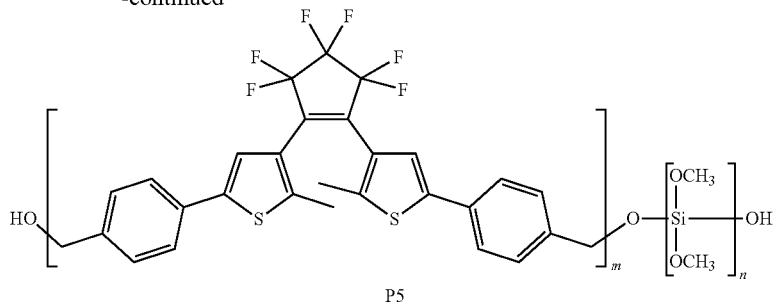

P5

As shown in reaction example 4, the bishydroxy-DTE may be contacted with a silane, such as methoxy or methylsilane, silanols, alkoxy silanes, and multifunctional silanes such as disilanes, vinylsilanes, hydrosilanes, and a suitable catalyst, such as a Lewis acid catalyst (DBDTL, dibutyltin dilaurate), to produce a polysiloxane with DTE groups, PRP P5. We note that the chemicals used in the aforementioned synthetic schemes may be obtained by conventional sources, such as Sigma-Aldrich, USA, or may be synthesized directly.

In some embodiments of this disclosure, a PRP may be applied to an article using a technique such as spin-coating or spray coating. After application of the PRP material, the film or coating may be reacted with UV light to produce a more rigid skin or coating on top of the article or substrate. Generally, a film or coating or bulk article containing ring-closed DTE groups may be produced with UV light of a wavelength from about 190 nm to about 399 nm in a dry, oxygen-free environment. Generally, UV radiation at a radiant exposure level of between about 0.1 J/cm2 and about 500 J/cm2 for a period of time of between about 0.1 seconds and about 100 seconds may be used in the processing. The UV radiation dosage and intensity may be adjusted to achieve the desired level of conversion, which may depend of material thickness and other factors. The UV radiation may be provided by any UV source, such as mercury microwave arc lamps (e.g., H bulb, H+ bulb, D bulb, Q bulb, and V bulb type lamps), pulsed xenon flash lamps, high-efficiency UV light emitting diode arrays, and UV lasers. Suitable optics may be employed, if desired, to pattern the radiation or confine exposure only to desired areas. A useful range of temperatures for the photoreactions may be from about −25° C. to about 25° C. Recovery of the less rigid coating may be achieved by exposure to visible light.

The forward and reverse photoreactions may be monitored by collecting percent conversion data using UV-visible spectroscopic techniques. Alternatively, or additionally, conversion and deconversion of the PRP photoreactive groups in the forward or the reverse photoreactions may be monitored by techniques such as nuclear magnetic resonance (NMR) spectroscopy.

In one embodiment of this disclosure, a cracked or otherwise structurally defective PRP may be healed by irradiation with UV light. This may be achieved by the formation of a cyclobutane (cyclic group) or other groups or bonds which bridge the two opposing surfaces. The formation and propagation of a crack or fracture, inside a polymeric material or on its surface, involves breaking of chemical bonds or polymer chains. Self-healing or self-repair requires formation of new chemical bonds between the opposing surfaces of the crack. One way of forming such bonds is by forming cyclobutane groups in a PRP material by UV exposure. In a related embodiment, PRPs may contain pendant photoresponsive functionality or chemical groups. The pendant photoresponsive groups may engage in photo-polymerization or dimerisation reactions, or other types of reactions, when irradiated with UV light to bridge or heal two opposing surfaces in a crack. It is expected that pendant groups have greater degrees of rotational and translational freedom to engage in photodimerisation reactions and may thus be advantageous in terms of efficacy and photo-yield. Such pendant photoresponsive groups may therefore provide enhanced "self-healing" properties for repairing cracks in PRP materials. In other embodiments of this disclosure, multifunctional DTE monomers or other photoresponsive monomers may have at least three functional groups so that a crosslinked polymer network with restricted freedom of movement and steric hindrance is produced.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. When a range is used to express a possible value using two numerical limits X and Y (e.g., a concentration of X ppm to Y ppm), unless otherwise stated the value can be X, Y, or any number between X and Y.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and their practical application, and to enable others of ordinary skill in the art to understand the invention.

The invention claimed is:
1. A method for producing a photoreactive polymer with variable modulus, comprising:
    forming a reaction mixture comprising photoreactive monomer, non-photoreactive monomer, and at least one catalyst, the photoreactive monomer comprising dithienylethene monomer;
    heating the reaction mixture at a temperature from about 25° C. to about 300° C. to form a cured photoreactive polymer; and isolating and then extruding the photoreactive polymer into cylindrical form.

2. The method of claim 1, wherein the non-photoreactive monomer comprises vinyl monomer.

3. The method of claim 1, wherein the non-photoreactive monomer are selected from a group consisting of ethylene, propylene, diene, urethane, vinylchloride, a silicon containing group, and a combination thereof.

4. The method of claim 3, wherein the diene is ethylidene norbornene, butadiene, or a combination thereof.

5. The method of claim 3, wherein the silicon containing group comprises silane, silanol, alkoxy silane, multifunctional silane, or a combination thereof.

6. The method of claim 1, wherein the photoreactive monomer absorbs ultraviolet radiation of wavelengths from 100 nm to 400 nm.

7. The method of claim 6, wherein the photoreactive polymer has at least one photoreaction product of ultraviolet radiation absorption.

8. The method of claim 7, wherein the at least one photoreaction product includes a cyclic carbon group.

9. The method of claim 8, wherein the cyclic carbon group is a product of a [2π+2π] cycloaddition reaction.

10. The method of claim 8, wherein the cyclic carbon group forms ring-open reaction products.

11. The method of claim 1, wherein the photoreactive monomer absorbs visible radiation of wavelengths from 400 nm to 700 nm.

12. The method of claim 11, wherein the photoreactive monomer comprise ring-open reaction products.

13. The method of claim 1, further comprising covalently bonding the photoreactive polymer to a conducting polymer.

14. The method of claim 13, wherein the conducting polymer is selected from the group consisting of a polyphenylene, a polypyrene, a polyazulene, a polynaphthalene, a polypyrrole, a polycarbazole, a polyindole, a polyazepine, a polyaniline, a polythiophene, and a combination thereof.

15. The method of claim 1, wherein the photoreactive polymer has a modulus that changes at a time that the photoreactive polymer is irradiated with ultraviolet or visible light.

16. A method for producing a photoreactive polymer with variable modulus, comprising:
   forming a reaction mixture comprising photoreactive monomer, non-photoreactive monomer, and at least one catalyst, the photoreactive monomer comprising dithienylethene monomer, the non-photoreactive monomer selected from the group consisting of ethylene, propylene, diene, urethane, vinylchloride, a silicon containing group, and a combination thereof;
   heating the reaction mixture at a temperature from about 25° C. to about 300° C. to form a cured photoreactive polymer; and
   isolating and then extruding the photoreactive polymer into cylindrical form.

17. The method of claim 16, wherein:
   the diene is ethylidene norbornene, butadiene, or a combination thereof; or
   the silicon containing group comprises silane, silanol, alkoxy silane, multifunctional silane, or a combination thereof; or
   a combination thereof.

18. The method of claim 16, wherein the photoreactive monomer comprises ring-open reaction products.

19. A method for producing a photoreactive polymer with variable modulus, comprising:
   forming a reaction mixture comprising photoreactive monomer, non-photoreactive monomer, and at least one catalyst, the photoreactive monomer comprising dithienylethene monomer, the non-photoreactive monomer selected from the group consisting of ethylene, propylene, diene, urethane, vinylchloride, a silicon containing group, and a combination thereof;
   heating the reaction mixture at a temperature from about 25° C. to about 300° C. to form a cured photoreactive polymer;
   isolating and then extruding the photoreactive polymer into cylindrical form; and
   covalently bonding the photoreactive polymer to a conducting polymer.

20. The method of claim 19, wherein conducting polymer is selected from the group consisting of a polyphenylene, a polypyrene, a polyazulene, a polynaphthalene, a polypyrrole, a polycarbazole, a polyindole, a polyazepine, a polyaniline, a polythiophene, and a combination thereof.

* * * * *